(12) United States Patent
Halun et al.

(10) Patent No.: US 12,156,103 B2
(45) Date of Patent: Nov. 26, 2024

(54) METHODS AND SYSTEMS FOR SIMULTANEOUSLY MONITORING MULTIPLE TALKGROUPS

(71) Applicant: MOTOROLA SOLUTIONS, INC., Chicago, IL (US)

(72) Inventors: Jakub Halun, Cracow (PL); Łukasz Cebula, Nowy Sącz (PL); Paweł Zieliński, Dębica (PL); Piotr Ślusarczyk, Stadniki (PL); Grzegorz Kaplita, Rzeszów (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 304 days.

(21) Appl. No.: 16/957,358

(22) PCT Filed: Dec. 29, 2017

(86) PCT No.: PCT/PL2017/050071
§ 371 (c)(1),
(2) Date: Jun. 23, 2020

(87) PCT Pub. No.: WO2019/132682
PCT Pub. Date: Jul. 4, 2019

(65) Prior Publication Data
US 2020/0329348 A1    Oct. 15, 2020

(51) Int. Cl.
*H04W 4/00*    (2018.01)
*H04W 4/029*    (2018.01)
(Continued)

(52) U.S. Cl.
CPC ............ *H04W 4/10* (2013.01); *H04W 4/029* (2018.02); *H04W 4/08* (2013.01); *H04W 4/90* (2018.02); *H04W 12/06* (2013.01)

(58) Field of Classification Search
CPC ......... H04W 4/90; H04W 4/02; H04W 4/029; H04W 4/023; H04W 4/025; H04W 64/00; H04W 4/08
See application file for complete search history.

(56) References Cited

U.S. PATENT DOCUMENTS 8,837,906 B2   9/2014   May et al.
11,036,920 B1 *  6/2021   Barndollar ............ H04L 51/046
(Continued)

OTHER PUBLICATIONS

International Search Report and Written Opinion dated Aug. 31, 2018 for related International Application No. PCT/PL2017/050071 (13 pages).

*Primary Examiner* — Omoniyi Obayanju
(74) *Attorney, Agent, or Firm* — Michael Best & Friedrich LLP

(57) ABSTRACT

Methods and systems for simultaneous monitoring of multiple talkgroups to reduce network congestion. The systems and methods include receiving data from a plurality of communication devices, wherein each of the plurality of communication devices is associated with a talkgroup member of the plurality of talkgroups and at least one talkgroup of the plurality of talkgroups; parsing the data received from each of the plurality of communication devices; dynamically detecting a content of interest within the parsed data based on a contextual relationship between a first talkgroup member associated with a first talkgroup and a second talkgroup member associated with a second talkgroup; notifying at least one of the first talkgroup member and the second talkgroup member when the content of interest is detected; and switching the first talkgroup member from the first talkgroup to the second talkgroup based on detecting the content of interest.

18 Claims, 6 Drawing Sheets

(51) Int. Cl.
*H04W 4/08* (2009.01)
*H04W 4/10* (2009.01)
*H04W 4/90* (2018.01)
*H04W 12/06* (2021.01)

(56) References Cited

U.S. PATENT DOCUMENTS

| | | | |
|---|---|---|---|
| 2006/0154682 A1* | 7/2006 | Shim | H04W 4/08 |
| | | | 455/518 |
| 2006/0158329 A1 | 7/2006 | Burkley et al. | |
| 2007/0202907 A1* | 8/2007 | Shaffer | H04W 4/08 |
| | | | 455/518 |
| 2007/0202908 A1* | 8/2007 | Shaffer | H04W 4/021 |
| | | | 455/518 |
| 2014/0243034 A1 | 8/2014 | Gurney et al. | |
| 2015/0072716 A1 | 3/2015 | Klein | |

* cited by examiner

METHODS AND SYSTEMS FOR SIMULTANEOUSLY MONITORING MULTIPLE TALKGROUPS

BACKGROUND OF THE INVENTION

Tablets, laptops, phones (for example, cellular or satellite), mobile (vehicular) or portable (personal) two-way radios, wearable device, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1A:
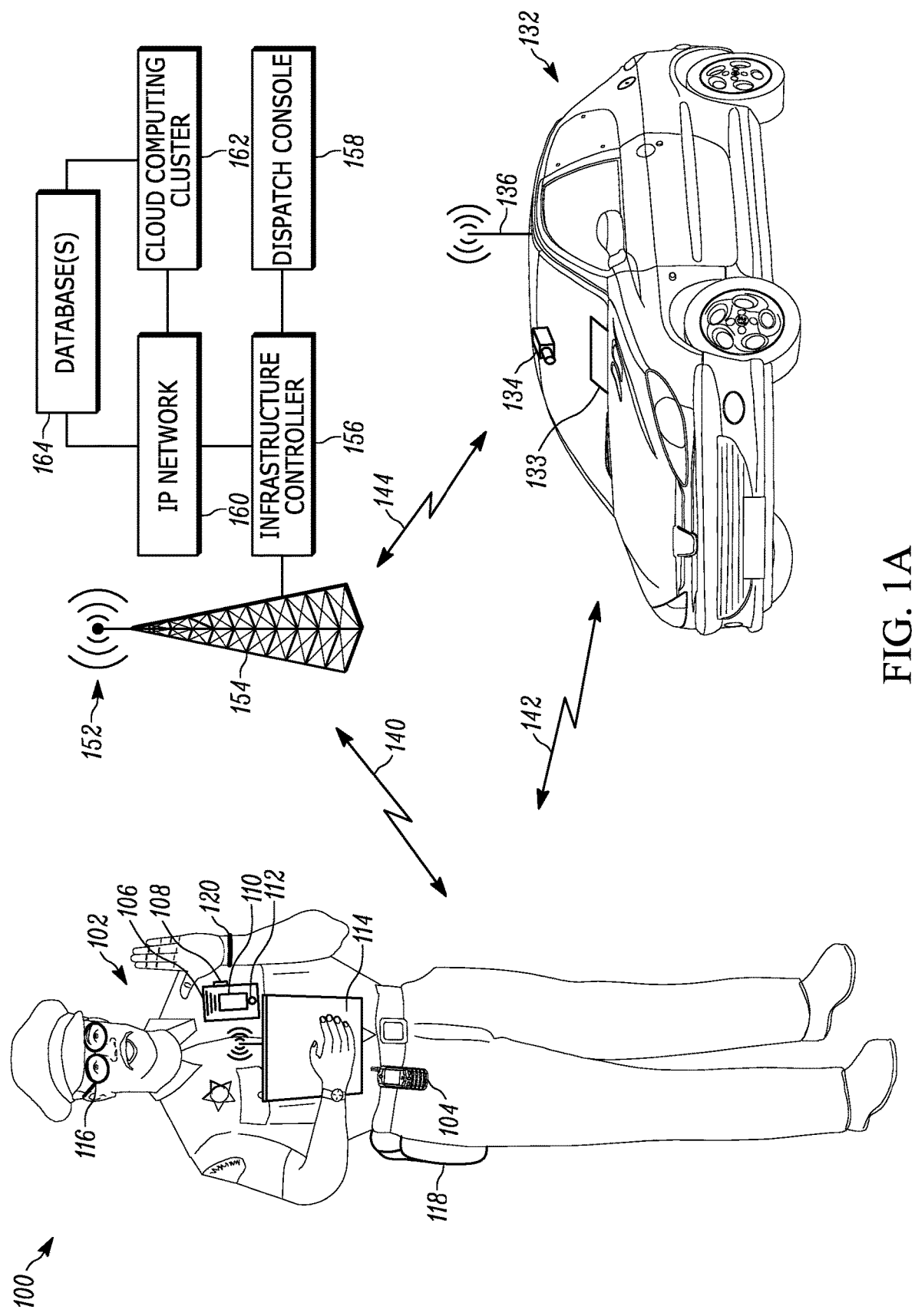
FIGS. 1A and 1B are system diagrams illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments illustrated.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

Communication devices often comprise, or provide access to, electronic digital assistants (sometimes referenced as "virtual partners" or a "virtual assistant") that may provide the user thereof (such as a first responder) with valuable information. A typical first responder is not capable of monitoring more than a few talkgroups at the same time. Embodiments provided herein allow for electronic digital assistants to monitor multiple threads of information associated with several talkgroups at the same time and inform a first responder when particular information relevant to the first responder is identified. Systems and methods provided herein allow for simultaneous monitoring of a set of selected talkgroups for a user's important content, using a virtual assistant. In some embodiments, content that is important to a user is recognized by observing that the user had responded to a talkgroup in reaction to that content. In some embodiments, systems and methods are provided that use multiple triggers associated with talkgroups like signals from internet of things (IoT) devices, behavior and context of talkgroup members, mobility events (for example, affiliations or de-affiliations), field-of-view (FOV) to execute virtual partner suggestions to regroup, merge talkgroups or send notifications.

One of the technical problems associated with how talkgroup users monitor multiple talkgroups for relevant information includes the presence of network congestion when several users (for example, first responders) switch back and forth between multiple talkgroups to monitor particular information of interest. Additionally, another technical problem is that audio streams from several users need to be delivered simultaneously to a single device in order for a first responder to be able to monitor multiple talkgroups of interest and determine as to which talkgroup to join. Systems and methods described herein provide, among other things, lower congestion, lower communication network utilization, and faster response times for talkgroup users. For example, in a situation where several first responders hear or see multiple explosions in different part of a city at more or less the same time, other first responders can be notified almost instantaneously based on conversations and data shared in the talkgroup by and between the several first responders closer to the location of the explosions.

One embodiment provides an electronic computing device configured to simultaneously monitor multiple talkgroups to reduce network congestion. The electronic computing device includes one or more electronic processors configured to receive data from a plurality of communication devices, wherein each of the plurality of communication devices is associated with a talkgroup member of the plurality of talkgroups and at least one talkgroup of the plurality of talkgroups; parse the data received from each of the plurality of communication devices; dynamically detect content of interest within the parsed data based on a contextual relationship between a first talkgroup member associated with a first talkgroup of the plurality of talkgroups and a second talkgroup member associated with a second talkgroup of the plurality of talkgroups; notify at least one of the first talkgroup member and the second talkgroup member when the content of interest is detected; and switch the first talkgroup member from the first talkgroup to the second talkgroup based on detecting the content of interest.

Another embodiment provides a method for simultaneous monitoring of multiple talkgroups to reduce network congestion. The method comprises receiving, with an electronic computing device, data from a plurality of communication devices, wherein each of the plurality of communication devices is associated with a talkgroup member of the plurality of talkgroups and at least one talkgroup of the plurality of talkgroups; parsing, with the electronic computing device, the data received from each of the plurality of communication devices; dynamically detecting, with the electronic computing device, a content of interest within the parsed data based on a contextual relationship between a first talkgroup member associated with a first talkgroup of the plurality of talkgroups and a second talkgroup member associated with a second talkgroup of the plurality of talkgroups; notifying at least one of the first talkgroup member and the second talkgroup member when the content of interest is detected; and switching, with the electronic computing device, the first talkgroup member from the first talkgroup to the second talkgroup based on detecting the content of interest.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

1. Communication System and Device Structures a. Communication System Structure

Figure 1B:
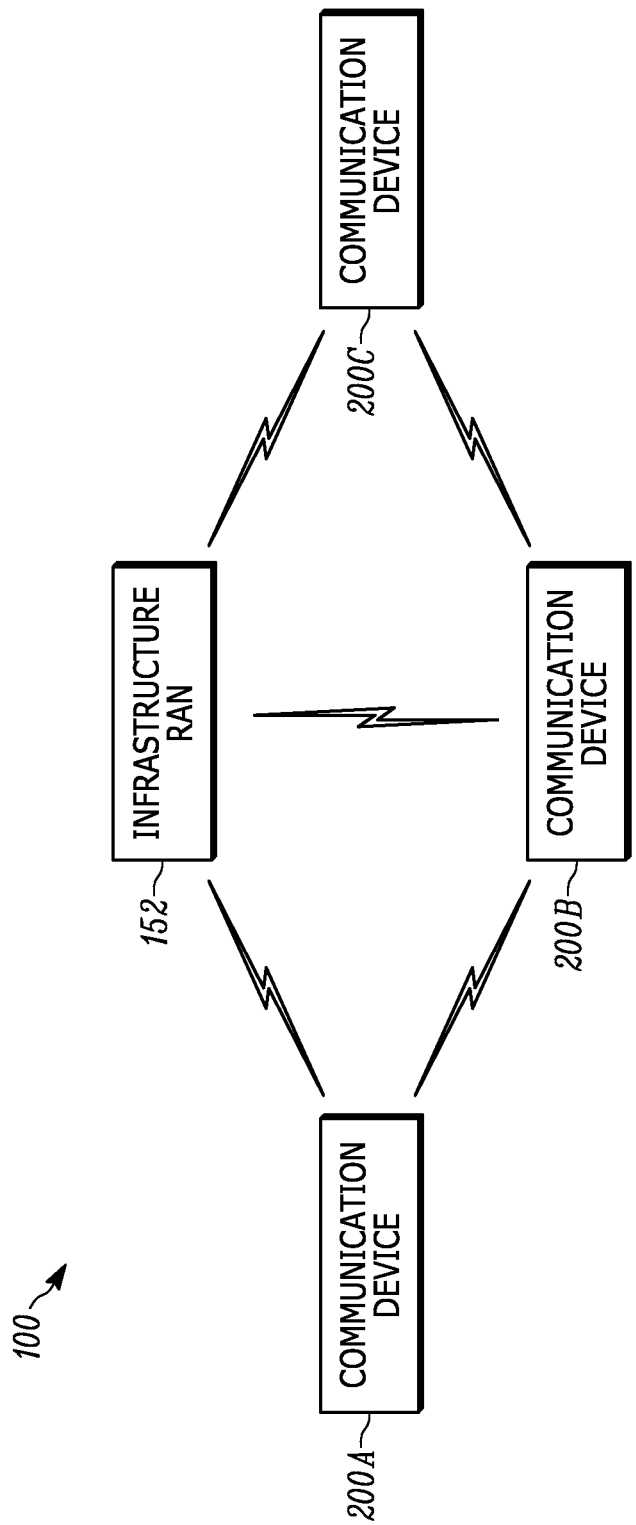

Referring now to the drawings, and in particular FIG. 1A, a communication system diagram illustrates a communication system 100 of devices including a first set of devices that a user 102 (illustrated in FIG. 1A as a first responder police officer) may wear, such as a primary battery-powered portable radio 104 used for narrowband and/or broadband direct-mode or infrastructure communications, a battery-powered radio speaker microphone (RSM) video capture device 106 (for example, body worn camera or PTZ camera), a laptop 114 having an integrated video camera and used for data applications such as incident support applications, smart glasses 116 (for example, which may be virtual reality, augmented reality, or mixed reality glasses), sensor-enabled holster 118, and/or biometric sensor wristband 120. Although FIG. 1A illustrates only a single user 102 with a respective first set of devices, in other embodiments, the single user 102 may include additional sets of same or similar devices, and additional users may be present with respective additional sets of same or similar devices as indicated by FIG. 1B.

Communication system 100 may also include a vehicle 132 associated with the user 102 having an integrated mobile communication device 133, an associated vehicular video camera 134, and a coupled vehicular transceiver 136. Although FIG. 1A illustrates only a single vehicle 132 with a single mobile communication device 133, respective single vehicular video camera 134 and/or microphone, and a single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In the example of FIG. 1A, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116. In some embodiments, the portable radio 104 may contain a short-range transmitter (for example, in comparison to the long-range transmitter such as a LMR or Broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single communication device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In some embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device. In other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (that is, supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. In some embodiments, a weapon of the user 102 may include a sensor that detects when the weapon is discharged. The detected discharge may be reported to the portable radio 104, for example. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of differential capacitive circuits or capacitive transducers to measure chest displacement and thus breathing rates. In other embodiments, a breathing sensor may monitor a periodicity of mouth and/or nose-exhaled air (for example, using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1A as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor. In some embodiments, the biometric sensor wristband 120 or another device of the user 102 may detect characteristics of the environment of the user 102 (for example, temperature, humidity, air quality, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID) or other short-range wireless protocol having a transmission range on the order of meters, tens of meters, or hundreds of meters.

The portable radio 104 and/or RSM video capture device 106 (or any other device in FIG. 1A, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS), a global navigation satellite system (GNSS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above. The omni-directional or uni-directional microphone, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link). In some embodiments, devices within the vehicle 132 may communicate with devices in other vehicles via a Vehicular to Vehicular (V2V) Network.

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, and the vehicle 132 are illustrated in FIG. 1A as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

In some embodiments, one or more of the user 102, the vehicle 132, the portable radio 104, the RSM video capture device 106, and any other device in FIG. 1A may be equipped with an environmental sensor such as a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1A, among other possibilities. At least one other terminal, for example used in conjunction with the communication devices, may be a fixed terminal, for example a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (for example, 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (for example, together which form an auditory data stream over time), such as according to RTP and internet protocols (IP), to the PTT server. The PTT server then transmits the auditory data packets to other users of the PoC session (for example, to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (for example, talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (for example, communication devices) could be provisioned in the network by the user or an agent, and then provided some form of group identity or identifier, for example. Then, at a future time, an originating user in a group may cause some signaling to be transmitted indicating that he or she wishes to establish a communication session (for example, group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1A, such a middleware server may be disposed in infrastructure RAN 152 at infrastructure controller 156 or at a separate cloud computing cluster 162 communicably coupled to infrastructure controller 156 via internet protocol (IP) network 160, among other possibilities.

The infrastructure RAN 152 is illustrated in FIG. 1A as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1A, or some other back-end infrastructure device or combination of back-end infrastructure devices existing on-premises or in the remote cloud computing cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud computing cluster 162 may be geographically co-located or may be separated by inches, meters, or miles, and inter-connected via electronic and/or optical interconnects. Although not shown in FIG. 1A, one or more proxy servers or load balancing servers may control which one or more computing devices perform any part or all of the electronic digital assistant service.

As shown in FIG. 1A, database(s) 164 may be accessible via the IP network 160 and/or the cloud computing cluster 162, and may include databases such as a long-term video storage database, a historical or forecasted weather database, an offender database perhaps including facial recognition images to match against, a cartographic database of streets and elevations, a traffic database of historical or current traffic conditions, or other types of databases. Databases 164 may further include all or a portion of the databases described herein as being provided at the infrastructure controller 156. In some embodiments, the databases 164 may be maintained by third parties (for example, the National Weather Service or a Department of Transportation, respectively). As shown in FIG. 1A, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1A are merely examples. In some embodiments, the communication system 100 additionally or alternatively includes other databases that store different information. In some embodiments, the databases 164 and/or additional or other databases are integrated with, or internal to, the infrastructure controller 156.

Finally, although FIG. 1A describes a communication system 100 generally as a public safety communication system that includes a user 102 generally described as a police officer and a vehicle 132 generally described as a police cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (for example, a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (for example, a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (for example, a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (for example, a medical gurney or ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (for example, an excavator, bulldozer, crane, front loader). Other possibilities exist as well.

As mentioned previously, many of the devices shown in FIG. 1A (such as the portable radio 104, the RSM video capture device 106, the laptop 114, the mobile communication device 133, the infrastructure controller 156, the dispatch console 158, and one or more computing devices in the cloud computing cluster 162) may be referred to as communication devices (for example, a communication device 200 as explained below with respect to FIG. 2). Although FIG. 1A shows multiple communication devices 200 associated with the user 102, in some embodiments, the communication system 100 includes communication devices 200 of multiple users. For example, as shown in FIG. 1B, the communication device 200A is associated with a first user, the communication device 200B is associated with a second user, and the communication device 200C is associated with a third user. As indicated by FIG. 1B, in some embodiments, the communication devices 200A, 200B, and 200C communicate with each other over the infrastructure RAN 152 and/or communicate with each other directly as described previously herein. Similarly, other devices, such as the dispatch console 158, may communicate with communication devices 200 of multiple users through the infrastructure RAN 152. In some embodiments, one or more users may have multiple associated communication devices 200, for example, as shown in FIG. 1A.

Figure 1C:
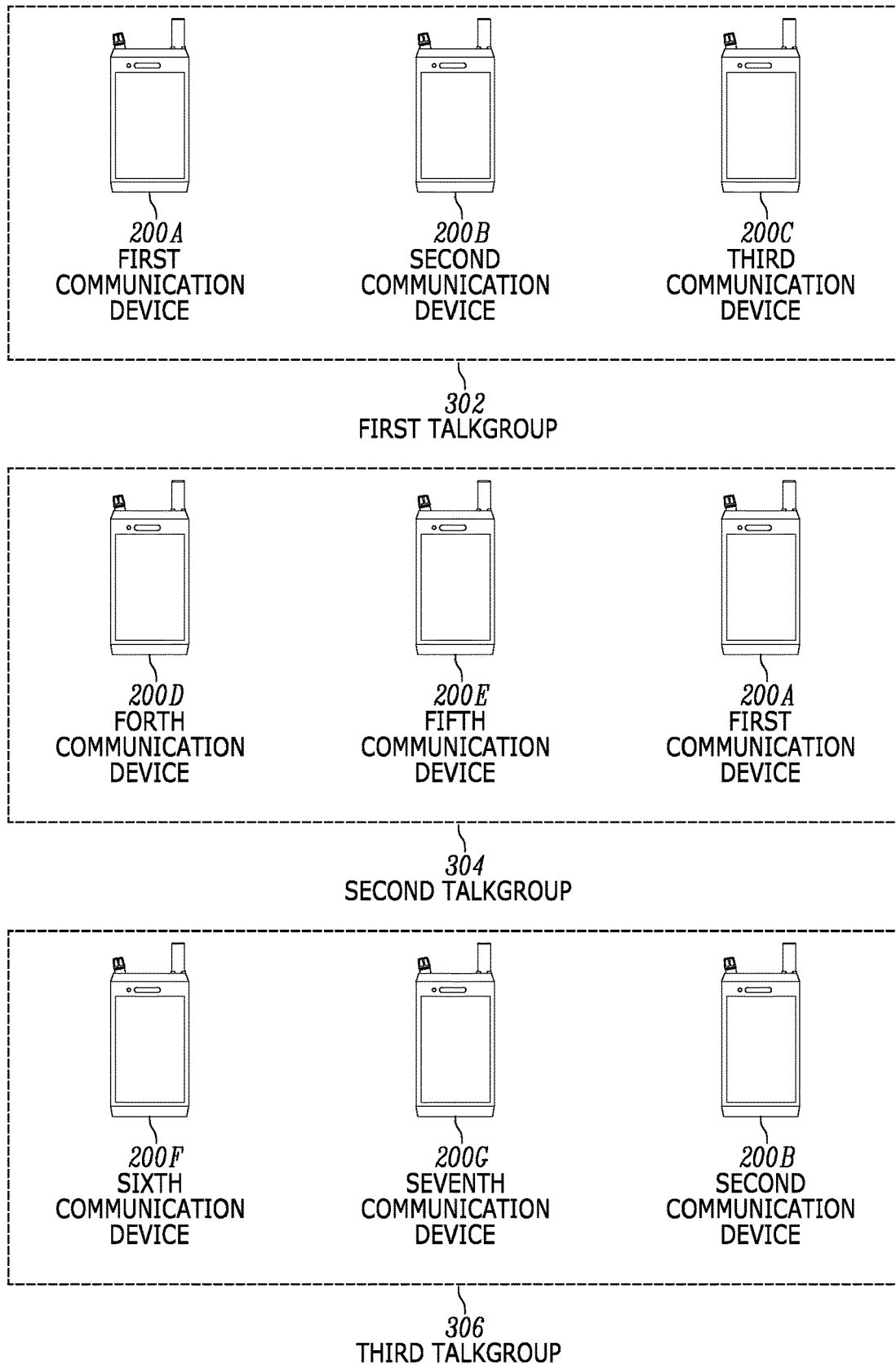
FIG. 1C illustrates a graphical representation of three exemplary talkgroups that include communication devices of the communication system shown in FIG. 1A and FIG. 1B.

FIG. 1C illustrates a graphical representation of three exemplary talkgroups 302, 304, and 306 that include the communication devices 200A through 200G. In other words, each communication device 200A through 200G is affiliated with at least one talkgroup. As indicated by FIG. 1C, communication devices may be affiliated with more than one talkgroup. For example, the first communication device 200A is affiliated with both the first talkgroup 302 and the second talkgroup 304. As shown in FIG. 1B, the first talkgroup 302 includes the first communication device 200A, the second communication device 200B, and the third communication device 200C. The second talkgroup 304 includes the fourth communication device 200D, the fifth communication device 200E, and the first communication device 200A. The third talkgroup 306 includes the sixth communication device 200F, the seventh communication device 200G, and the second communication device 200B.

Throughout the following description, reference is made to the talkgroups 302, 304, and 306 and the communication devices 200A through 200G to provide examples of the methods and systems being explained. The talkgroups 302, 304, and 306 are merely exemplary and have been simplified for the sake of explanation. In some embodiments, the communication system 100 includes more or fewer communication devices and more or fewer talkgroups. In some embodiments, the talkgroups have more or fewer affiliated communication devices. In some embodiments, the talkgroups do not have the same number of affiliated communication devices.

b. Device Structure

Figure 2:
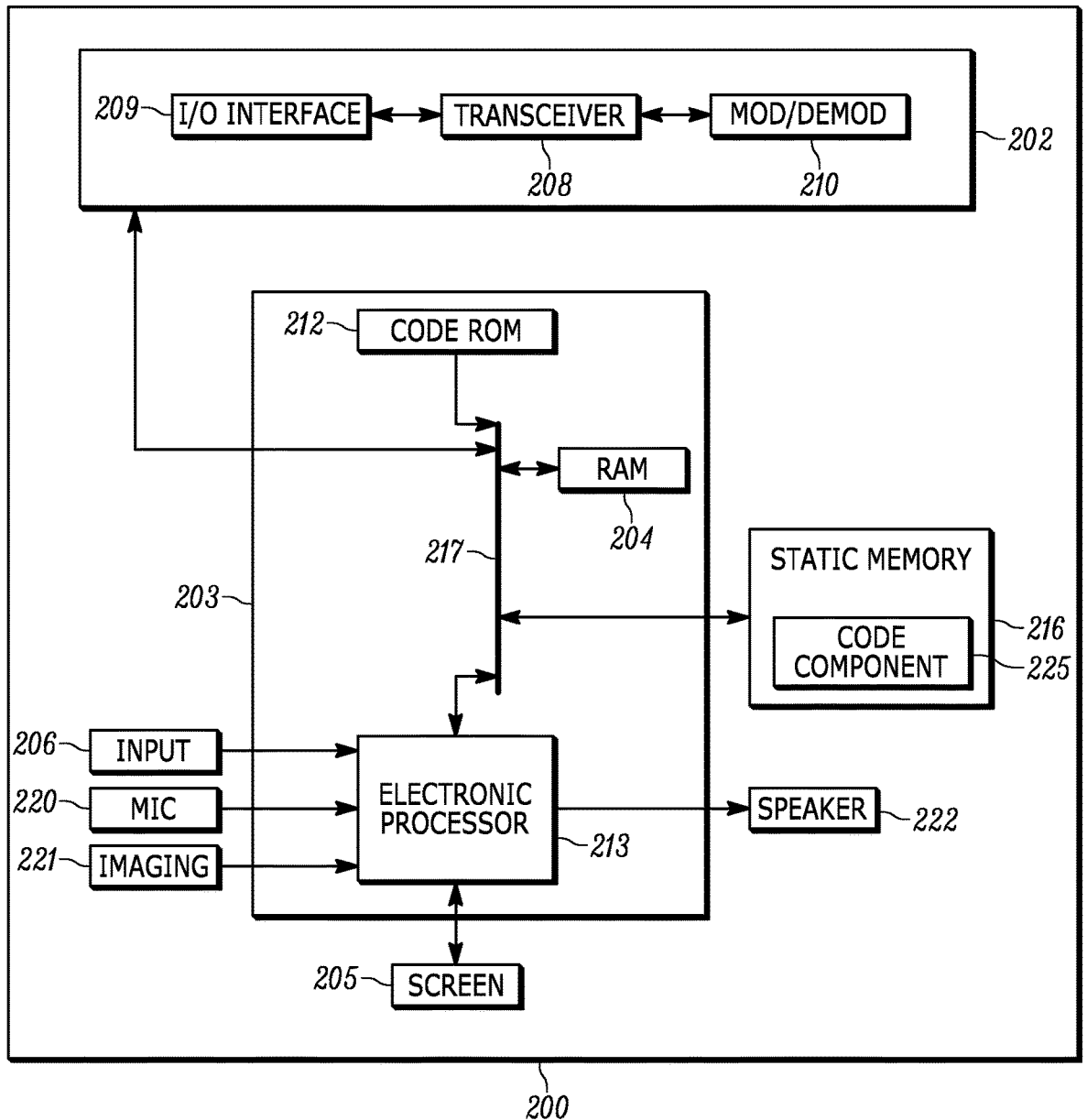
FIG. 2 is a device diagram showing a device structure of a communication device of the system of FIGS. 1A and 1B in accordance with some embodiments.

FIG. 2 sets forth a schematic diagram that illustrates a communication device 200 according to some embodiments. The communication device 200 may be, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1A, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 2 represents the communication devices described above with respect to FIGS. 1A and 1B, depending on the type of the communication device, the communication device 200 may include fewer or additional components in configurations different from that illustrated in FIG. 2. For example, in some embodiments, the communication device 200 acting as the infrastructure controller 156 may not include one or more of the display screen 205, microphone 220, imaging device 221, and speaker 222. As another example, in some embodiments, the communication device 200 acting as the portable radio 104 or the RSM video capture device 106 may further include a location determination device (for example, a global positioning system (GPS) receiver) as explained above. Other combinations are possible as well.

As shown in FIG. 2, the communication device 200 includes a communications unit 202 coupled to a common data and address bus 217 of a processing unit 203 that includes an electronic processor 213. The communication device 200 may also include one or more input devices (for example, keypad, pointing device, touch-sensitive surface, button, a microphone 220, an imaging device 221, and/or another input device 206) and an electronic display screen 205 (which, in some embodiments, may be a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as a the portable radio 104, the laptop 114, the wireless RAN 152, and/or the mobile communication device 133. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIG. 3 and the accompanying text. In some embodiments, the static memory 216 may also store, permanently or temporarily, audio data received by the microphone 220, text data transcribed from the audio data, and context information determined from the audio data and/or text data as explained in greater detail below.

The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

2. Processes for Simultaneous Monitoring of Multiple Talkgroups to Reduce Network Congestion In some embodiments, an individual component and/or a combination of individual components of the communication system 100 may be referred to as an electronic computing device that implements an electronic digital assistant as mentioned above. For example, the electronic computing device may be a single electronic processor (for example, the electronic processor 213 of the portable radio 104). In other embodiments, the electronic computing device includes multiple electronic processors distributed remotely from each other. For example, the electronic computing device may be implemented on a combination of at least two of the electronic processor 213 of the portable radio 104, the electronic processor 213 of the infrastructure controller 156, and the electronic processor 213 of a back-end device in the cloud computing cluster 162 accessible via the IP network 160.

Figure 3:
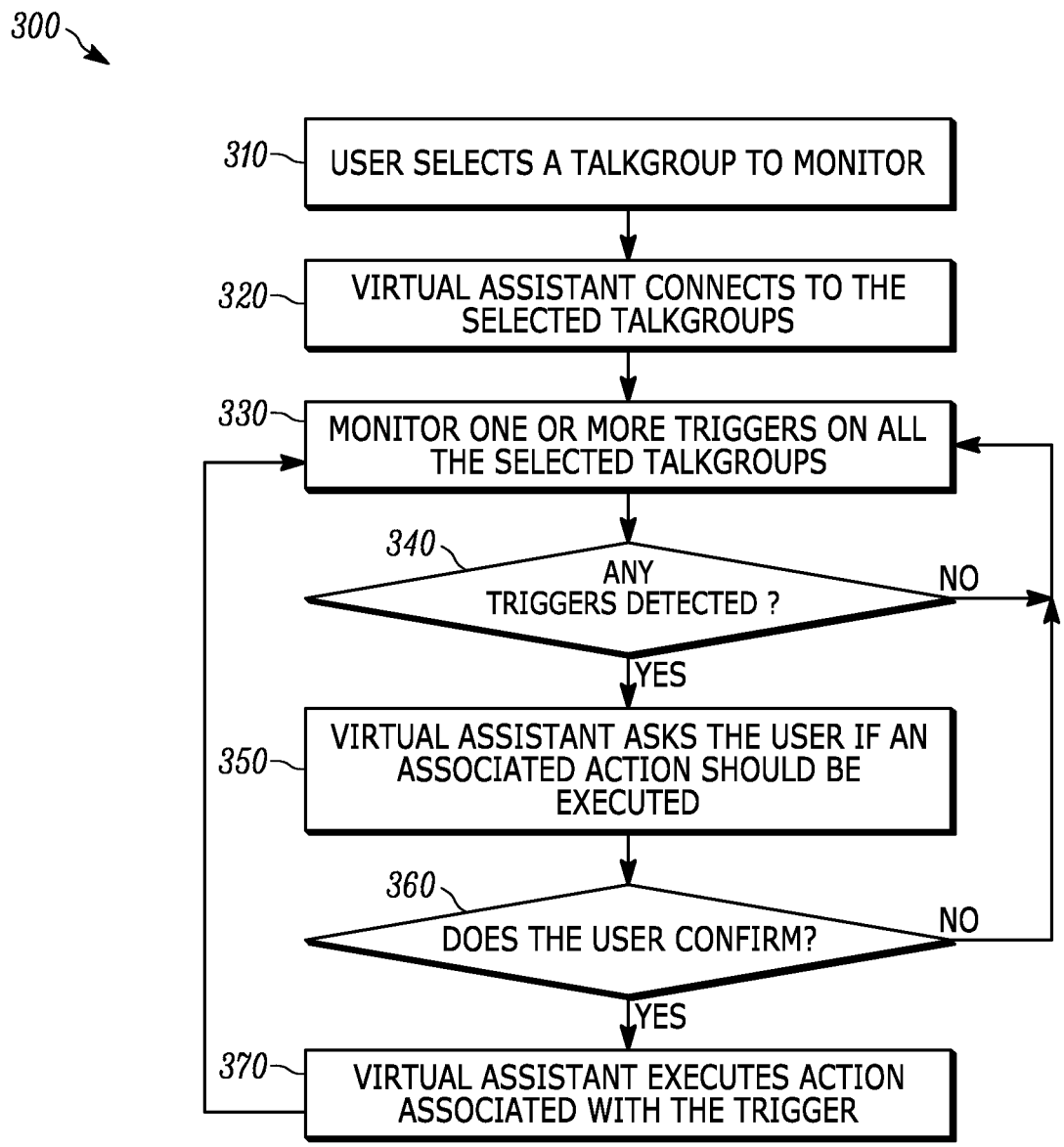
FIG. 3 illustrates a flow chart of a method for simultaneous monitoring of talkgroups using a virtual assistant, in accordance with some embodiments.

FIG. 3 illustrates a flow chart of a method 300 for simultaneous monitoring of talkgroups using a virtual assistant, in accordance with some embodiments. At block 310, a user (for example, a first responder) associated with a communication device 200A selects a talkgroup 306 to monitor. As shown in FIG. 1C, the communication device 200A is part of talkgroups 302 and 304 and is not part of talkgroup 306. At block 320, a virtual assistant connects to the talkgroup 306. At block 330, the virtual assistant monitors one or more triggers within the talkgroup 306. In some embodiments, the trigger may include specific words, phrases or sounds (for example, an explosion, siren, alarm, etc.).

In one example, the trigger may be having multiple first responders using similar words to describe the same scene, event, or people in different talkgroups. In one example, the trigger is a question detected in talkgroup 302, which may already be answered in a different talkgroup 306. In some embodiments, the trigger is a command detected in another talkgroup. In one example, the command is one used in police crowd control, "move the shields forward." Other commands are used in accordance with the circumstances of the public safety incident. In some embodiments, the trigger is a conversation that is related to a subject (or subject matter) that a user had talked about not long ago. In some embodiments, the trigger is a conversation that is associated with a subject having special security clearance. In some embodiments, the virtual assistant detects that a person associated with a recent conversation has moved to another talkgroup. In some embodiments, a trigger is generated when a first responder passes by a place of interest (for example, a place where a criminal activity has taken place) to the first responder. In some embodiments, a trigger is generated when multiple users have selected the same target using their navigation system. In some embodiments, a trigger is initiated when a suspect moves towards a particular user or passes by the user. In some embodiments, a trigger is generated when it is determined that a group of first responders are observing the same object based on a field-of-view (FOV) analysis. A trigger is also initiated, in some cases, when a group of first responders listen to similar sounds (for example, explosions, gun shots in various parts of the city associated with a coordinated terrorist attack) at the same time. In some embodiments, the trigger is initiated when an officer's commander has moved to another talkgroup. In some embodiments, the trigger is initiated based on similar signals (for example, too high a concentration of poisonous gas) recognized by multiple internet-of-things devices from officers affiliated with different talkgroups. In some embodiments, the virtual assistant provides a brief description of the context associated with a trigger. For example, the virtual assistant may inform the user that there is too high a concentration of a poisonous gas.

At block 340, when the trigger is detected, the method 300 proceeds to block 350. When no trigger is detected at block 340, the method 300 reverts back to block 330. At block 350, the virtual assistant requests the user of the communication device 200A to confirm whether an associated action should be executed. In some embodiments, the associated action includes notifying other team members that a specific trigger was detected in the talkgroup. At block 360, when the user confirms that the associated action should be executed, the method 300 proceeds to block 370. On the other hand, when the user does not confirm that an associated action should be executed, then the method 300 proceeds to block 330. At block 370, the virtual assistant executes the action associated with the trigger determined in block 340. In some embodiments, the action associated with the trigger includes the virtual assistant proposing to create a new talkgroup based on the various triggers detected.

Figure 4:
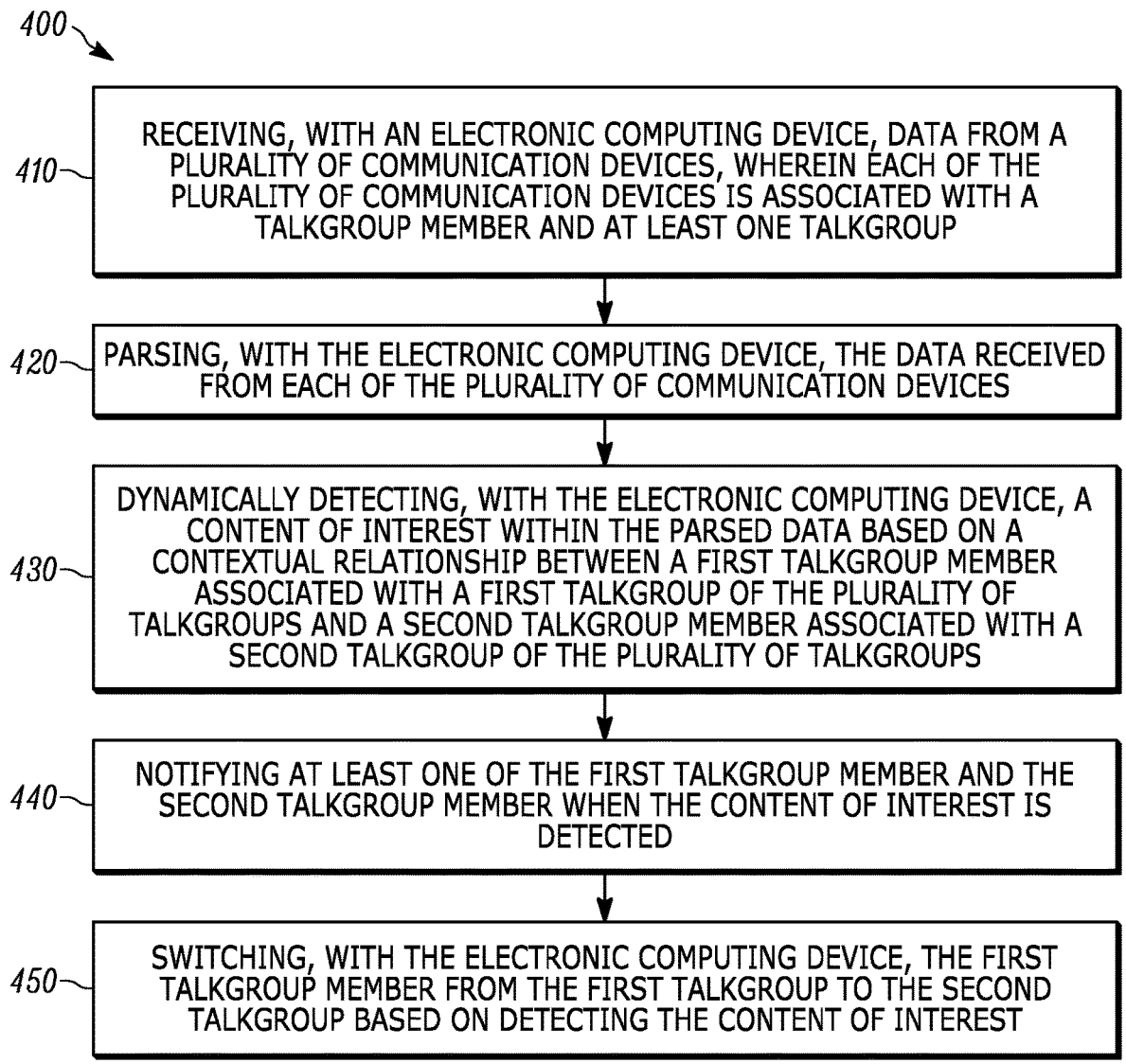
FIG. 4 illustrates a flow chart of a method for simultaneous monitoring of multiple talkgroups, in accordance with some embodiments.

FIG. 4 illustrates a flow chart of a method 400 for coordinating communications within talkgroups, in accordance with some embodiments. At block 410, the electronic computing device receives data from a plurality of communication devices, for example communication devices 200A, 200B, 200C, 200D, 200F and 200G shown in FIG. 1C. In some embodiments, the electronic computing device listens to and records simultaneously all of the data associated with particular talkgroups that are selected by a talkgroup member such as a first responder (block 310). In some embodiments, the electronic computing device uses a dispatch console 158 for connecting and recording audio data from several talkgroups (block 320).

In some embodiments, the communication device includes or has access to a talkgroup member's input and location devices, for example, a camera, a microphone, a global positioning receiver or other portable communication device. As shown in FIG. 1C each of the communication devices 200A, 200B, 200C, 200D, 200F and 200G is associated with the talkgroup member. Additionally, each of the communication devices 200A, 200B, 200C, 200D, 200F and 200G is associated with at least one talkgroup. For example, first communication device 200A is associated with the first talkgroup 302 and the second talkgroup 304 only and the third communication device 200C is associated with the first talkgroup 302 only. The first communication device 200A does not have access to the third talkgroup 306 and the third communication device 200C does not have access to either of the second talkgroup 304 and the third talkgroup 306.

At block 420, the electronic computing device parses the data received from each of the plurality of communication devices. In some examples, the electronic computing device may include a natural language processing (NLP) engine configured to determine the intent and/or content of a particular communication within a talkgroups. In some embodiments, one or more of the communication device 200, embodied in one or more of the communication devices of FIG. 1A, such as the portable radio 104, the infrastructure controller 156, and/or cloud computing cluster 162 include a natural language processing engine to monitor conversations received by the microphone 220 of the communication device 200. In some embodiments, the electronic computing device is configured to analyze voice in a cloud computing cluster 162.

At block 430, the electronic computing device dynamically detects content of interest within the parsed data based on a contextual relationship between a first talkgroup member (for example, a first responder carrying first communication device 200A) associated with a first talkgroup 302 and a second talkgroup member (for example, a first responder carrying a forth communication device 200D) associated with a second talkgroup 304. In some embodiments, the content of interest includes at least one of a geographical location of a talkgroup member, a profile or identity of the talkgroup member (for example, whether the talkgroup member such as a first responder is a commander, a team member, etc.). In some embodiments, the electronic computing device is configured to dynamically detect the content of interest within the parsed data based on at least one of an image data, audio data, textual data, haptic data, weather data, movement data, biometric data, orientation data, field of view data, computer record data, and a geographical location data that provides a contextual relationship between the first talkgroup member (for example, a first responder carrying first communication device 200A) and the second talkgroup member (for example, a first responder carrying a forth communication device 200D).

In one example, the contextual relationship maybe established based on a subject matter that a user has talked about not long ago. In another example, when multiple users have chosen the same target using their individual navigation systems, then a contextual relationship between the users is formed. In some embodiments, if a group of first responders are witnessing the same object or event (for example, fire of a skyscraper) then a contextual relationship is established (irrespective of their individual locations) based on a field-of-view analysis of the images received at their video cameras. In another example, a contextual relationship may be established based on a common suspect that several officers are in pursuit but are not aware that they are all tracking the same suspect.

In some embodiments, the electronic computing device is configured to identify text, audio, image, or video data shared within a particular talkgroup. In some embodiments, the electronic computing device is configured to create a talkgroup including a set of first responders based on a particular context associated with the set of first responders. For example, when a first responder associated with a first communication device 200A and another first responder associated seventh communication device 200G shares a content of interest then the electronic computing device is configured to create a new talkgroup including the first communication device 200A and the seventh communication device 200G. In some embodiments, when a commander moves from a first talkgroup to a second talkgroup, then the electronic computing device is configured to move the officers reporting to the commander from the first talkgroup to the second talkgroup.

In some embodiments, the electronic computing device is configured to dynamically detect the content of interest within the parsed data based on at least one selected from the group consisting of image data, audio data, textual data, haptic data, weather data, movement data, biometric data, orientation data, field-of-view data, computer record data, and geographical location data received from one or more sensors associated with communication device of a talkgroup member. In some embodiments, the content of interest within the parsed data is used to notify a team member and request permission for switching to a new talkgroup.

At block 440, the electronic computing device notifies one or more of the plurality of communication devices when the content of interest is detected. In some embodiments, the electronic computing device is configured to forward a particular command or a message that is related to an officer or first responder not in a particular talkgroup. In some embodiments, when a user turns off their associated radio and someone else in the user's team or talkgroup discusses information associated with a content of interest related to the user, then the electronic computing device sends a talkgroup member the information associated with the content of interest when the user turns on their radio. In some embodiments, the electronic computing device is configured to notify a talkgroup member using an audible alarm or message. In some embodiments, the electronic computing device is configured to notify the talkgroup member using a text message.

At block 450, the electronic computing device switches the first talkgroup member from a first talkgroup to a second talkgroup based on detecting the content of interest. In some embodiments, the electronic computing device is configured to automatically switch a first talkgroup member from a first talkgroup to a second talkgroup based on detecting particular content of interest. For example, when a second talkgroup 306 shares information related to an incident (for example, a traffic accident, a criminal act, explosion, etc.) within an immediate vicinity of a first talkgroup member (for example, a user associated with communication device 200A), then the first talkgroup member is automatically switched to the second talkgroup. In some embodiments, the method 400 includes sending a switching authorization request to the first talkgroup member to switch the first talkgroup member from the first talkgroup 302 to the second talkgroup 306. In some embodiments, the electronic computing device is configured to switch the first talkgroup member from the first talkgroup 302 to the second talkgroup 306 when it receives an approval from the first talkgroup member. In some embodiments, the method 400 includes merging, with the electronic computing device, one or more talkgroups together based on a common content of interest. For example, if a first talkgroup is discussing about an terrorist attack (for example, an explosion) in one part of town and a second talkgroup is sharing images related to an explosion in town, then the virtual assistants associated with each of the communication devices in the first talkgroup and the second talkgroup proposes to each of the talkgroup members about the creation of a new talkgroup related to what might be a terrorist attack. In some embodiments, first responders closest to the explosion are invited to participate in a newly merged talkgroup associated with the above mentioned terrorist attack.

In some embodiments, a particular talkgroup is split into two or more talkgroups based on the contextual relationship between the various talkgroup members. For example, when a first set of talkgroup members discussing a particular topic (for example, a bank robbery) and a second set of talkgroup members are sharing videos unrelated to the bank robbery (for example, images related to an automobile accident in another part of the town) then the two sets of talkgroup members can be split into different talkgroups.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An electronic computing device for simultaneous monitoring of a plurality of talkgroups to reduce network congestion, the electronic computing device comprising:
   one or more electronic processors configured to
      receive audio data from a plurality of communication devices, wherein the audio data includes conversations received by one or more microphones of the plurality of communication devices and wherein each of the plurality of communication devices is associated with a talkgroup member and at least one talkgroup;
      parse the conversations in the audio data received from each of the plurality of communication devices using natural language processing to generate, for each of the plurality of communication devices, parsed audio data that includes a content for a voice communication within the at least one talkgroup associated with the communication device;
      dynamically detect, within the content of the parsed audio data, a content of interest based on a contextual relationship between a first talkgroup member associated with a first talkgroup of the plurality of talkgroups and a second talkgroup member associated with a second talkgroup of the plurality of talkgroups, wherein the content of interest includes at least one selected from the group consisting of a profile of the talkgroup member and an identity of the talkgroup member, wherein the first talkgroup member is a member of a team and the second talkgroup member is a commander of the team;
      notify at least one of the first talkgroup member and the second talkgroup member when the content of interest is detected;
      switch the first talkgroup member from the first talkgroup to the second talkgroup based on detecting the content of interest; and
      responsive to the commander moving from the second talkgroup to a third talkgroup, switch all members of the team to the third talkgroup.

2. The electronic computing device of claim 1, wherein the one or more electronic processors are further configured to notify the team member that the commander has moved from the second talkgroup to a third talkgroup; and request permission to switch the team member to the third talkgroup.

3. The electronic computing device of claim 1, wherein the plurality of communication devices are selected from the group consisting of a dispatch console, a video camera, a microphone, a sensor, a wearable device, a global positioning satellite receiver, and a portable communication device.

4. The electronic computing device of claim 1,
wherein the contextual relationship between the first talkgroup member associated with the first talkgroup of the plurality of talkgroups and the second talkgroup member associated with the second talkgroup of the plurality of talkgroups includes at least one selected from the group consisting of status data associated with the first talkgroup member, image data, the audio data, textual data, haptic data, weather data, movement data, biometric data, orientation data, field of view data, computer record data, and geographical location data.

5. The electronic computing device of claim 1, wherein the one or more electronic processors are further configured to
detect a command received from the first talkgroup member, and
provide an alert to the second talkgroup based on the command.

6. The electronic computing device of claim 1, wherein the one or more electronic processors are further configured to
merge the first talkgroup and the second talkgroup based on the content of interest.

7. The electronic computing device of claim 1, wherein the one or more electronic processors are further configured to
split the first talkgroup into a third talkgroup and a fourth talkgroup based on the content of interest.

8. The electronic computing device of claim 1, wherein the one or more electronic processors are further configured to
send a notification to the first talkgroup member, wherein the notification includes a switching authorization request to switch the first talkgroup member from a first talkgroup to a second talkgroup.

9. The electronic computing device of claim 8, wherein the one or more electronic processor are further configured to
automatically switch the first talkgroup member from a first talkgroup to a second talkgroup based on a notification received from the first talkgroup member.

10. A method for simultaneous monitoring of multiple talkgroups to reduce network congestion, the method comprising:
receiving, with an electronic computing device, audio data from a plurality of communication devices, wherein the audio data includes conversations received by one or more microphones of the plurality of communication devices and wherein each of the plurality of communication devices is associated with a talkgroup member of the plurality of talkgroups and at least one talkgroup of the plurality of talkgroups;
parsing, with the electronic computing device, the conversations in the audio data received from each of the plurality of communication devices using natural language processing to generate, for each of the plurality of communication devices, parsed audio data that includes a content for a voice communication within the at least one talkgroup associated with the communication device;
dynamically detecting, with the electronic computing device, within the content of the parsed audio data, a content of interest based on a contextual relationship between a first talkgroup member associated with a first talkgroup of the plurality of talkgroups and a second talkgroup member associated with a second talkgroup of the plurality of talkgroups, wherein the content of interest includes at least one selected from the group consisting of a profile of the talkgroup member and an identity of the talkgroup member, wherein the first talkgroup member is a member of a team and the second talkgroup member is a commander of the team;
notifying at least one of the first talkgroup member and the second talkgroup member when the content of interest is detected;
switching, with the electronic computing device, the first talkgroup member from the first talkgroup to the second talkgroup based on detecting the content of interest; and
responsive to the commander moving from the second talkgroup to a third talkgroup, switching all members of the team to the third talkgroup.

11. The method of claim 10 further comprising:
providing a notification to the first talkgroup member that the second talkgroup member has moved from the second talkgroup to a third talkgroup.

12. The method of claim 10 further comprising:
notifying a third talkgroup member associated with a third group of the plurality of talkgroups based on the content of interest.

13. The method of claim 10 further comprising:
detecting a specific command received from a commander in the first talkgroup, and
switching a team member in the second talkgroup to the first talkgroup second talkgroup based on the specific command.

14. The method of claim 10 further comprising:
merging the first talk group and the second talk group based on the content of interest.

15. The method of claim 10 further comprising:
automatically switching, with the electronic computing device, the first talkgroup member from a first talkgroup to the second talkgroup based on a notification received from the second talkgroup member.

16. The method of claim 10 further comprising:
sending a switching authorization request to the first talkgroup member, and
switching the first talkgroup member from the first talkgroup to the second talkgroup.

17. The method of claim 16, further comprising:
receiving an approval to switch the first talkgroup member from the first talkgroup to the second talkgroup.

18. The method of claim 10, further comprising:
dynamically detecting the content of interest within the parsed audio data based on at least one selected from the group consisting of an image data, the audio data, textual data, haptic data, weather data, movement data, biometric data, orientation data, field of view data, computer record data, and a geographical location data.

* * * * *